United States Patent
Sutterfield et al.

(10) Patent No.: US 11,313,320 B2
(45) Date of Patent: Apr. 26, 2022

(54) EXHAUST NOZZLE WITH CENTERBODY SUPPORT STRUCTURE FOR A GAS TURBINE ENGINE

(71) Applicants: Rolls-Royce North American Technologies Inc., Indianapolis, IN (US); Rolls-Royce Corporation, Indianapolis, IN (US)

(72) Inventors: David L. Sutterfield, Greenwood, IN (US); Jack D. Petty, Indianapolis, IN (US); Bryan H. Lerg, Carmel, IN (US); Andrew Sanderson, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 100 days.

(21) Appl. No.: 16/803,521

(22) Filed: Feb. 27, 2020

(65) Prior Publication Data
US 2021/0270208 A1 Sep. 2, 2021

(51) Int. Cl.
*F02K 1/04* (2006.01)
*F02K 1/80* (2006.01)
*F02K 1/08* (2006.01)

(52) U.S. Cl.
CPC .............. *F02K 1/04* (2013.01); *F02K 1/08* (2013.01); *F02K 1/80* (2013.01); *F05D 2220/32* (2013.01)

(58) Field of Classification Search
CPC .................................... F02K 1/04; F02K 1/80
See application file for complete search history.

(56) References Cited

U.S. PATENT DOCUMENTS

| | | | | |
|---|---|---|---|---|
| 3,237,864 | A * | 3/1966 | Rabone | C07C 233/00 239/127.3 |
| 3,352,494 | A * | 11/1967 | Roberts | F02K 1/09 239/265.13 |
| 3,391,869 | A * | 7/1968 | Glass | F02K 1/08 239/265.19 |
| 3,612,398 | A * | 10/1971 | Timms | F02K 1/08 239/127.3 |
| 3,612,402 | A * | 10/1971 | Timms | B64C 9/38 239/265.29 |
| 3,829,020 | A | 8/1974 | Stearns | |
| 4,043,508 | A | 8/1977 | Speir et al. | |
| 4,074,859 | A * | 2/1978 | Lowman, Jr. | B64D 33/04 239/265.33 |
| 4,244,294 | A | 1/1981 | Frignac et al. | |
| 4,295,611 | A | 10/1981 | Wynosky et al. | |
| 4,527,388 | A | 7/1985 | Wallace, Jr. | |
| 4,592,508 | A | 6/1986 | Thornock | |
| 4,802,629 | A | 2/1989 | Klees | |
| 7,174,704 | B2 | 2/2007 | Renggli | |
| 7,178,338 | B2 | 2/2007 | Whurr | |

(Continued)

*Primary Examiner* — Lorne E Meade
(74) *Attorney, Agent, or Firm* — Barnes & Thornburg LLP

(57) ABSTRACT

An exhaust nozzle for use with a gas turbine engine includes an outer shroud, an inner plug spaced radially apart from the outer shroud, and at least one support vane that is coupled to the outer shroud. The outer shroud and the inner plug cooperate to provide an exhaust nozzle flow path therebetween. The at least one support vane interconnects the outer shroud and the inner plug to support the inner plug in the exhaust nozzle flow path.

20 Claims, 3 Drawing Sheets

(56) References Cited

U.S. PATENT DOCUMENTS

| | | |
|---|---|---|
| 7,886,518 B2 | 2/2011 | Moniz et al. |
| 8,850,823 B2 | 10/2014 | Ress et al. |
| 9,181,899 B2 | 11/2015 | Dindar et al. |
| 10,400,621 B2 | 9/2019 | Sawyers-Abbott et al. |
| 10,451,003 B2 * | 10/2019 | Sutterfield ............. F16M 13/02 |
| 2010/0095650 A1 | 4/2010 | Schafer |
| 2012/0192543 A1 | 8/2012 | Aeberli et al. |

* cited by examiner

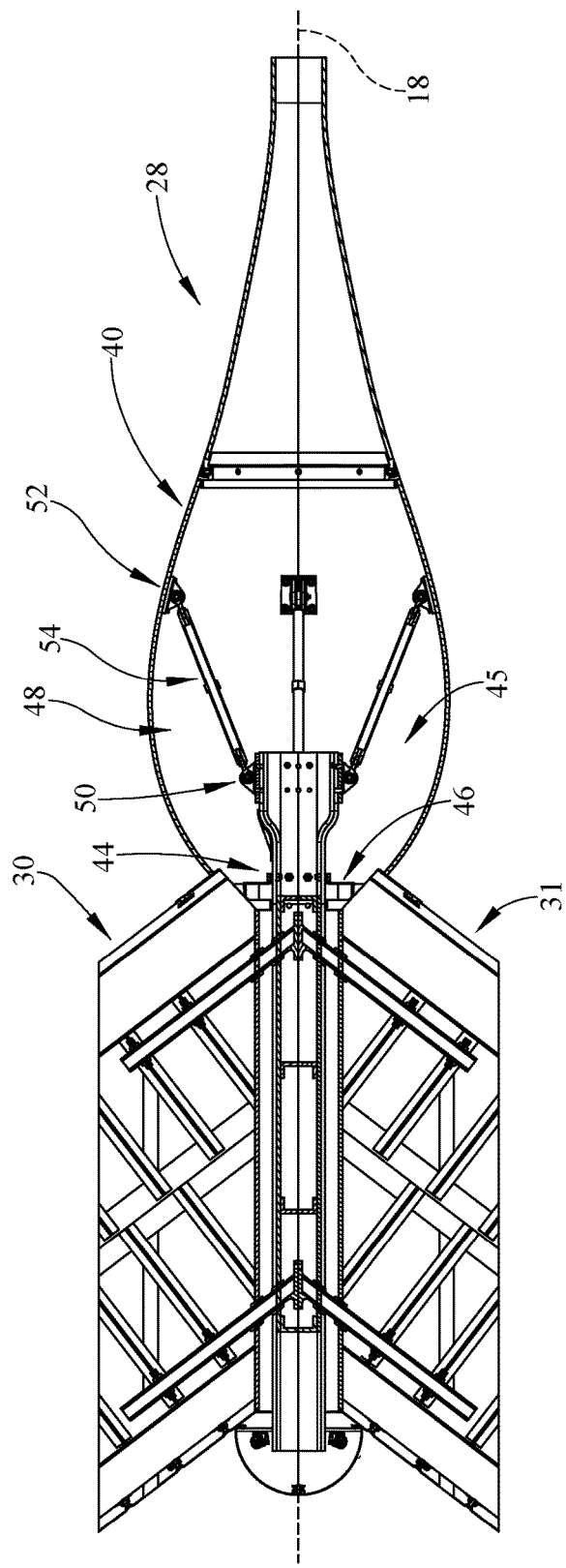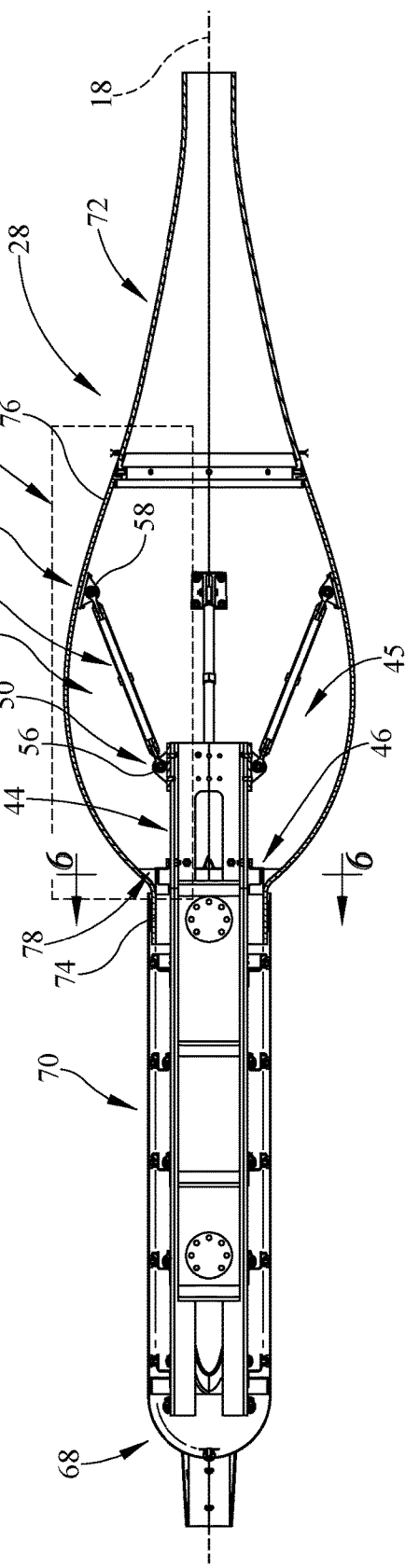
FIG. 3
FIG. 4

EXHAUST NOZZLE WITH CENTERBODY SUPPORT STRUCTURE FOR A GAS TURBINE ENGINE

FIELD OF THE DISCLOSURE

The present disclosure relates generally to gas turbine engines, and more specifically to exhaust nozzles for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion may be released out of the turbine into an exhaust nozzle where they are directed away from the engine.

Exhaust nozzles may encounter relatively high temperatures due to their proximity to the turbine and the hot products discharged therefrom. Accordingly, supporting various components in the exhaust nozzle while considering these relatively high temperatures remains an area of interest.

SUMMARY

The present disclosure may comprise one or more of the following features and combinations thereof.

According to a first aspect of the present disclosure a gas turbine engine may include an engine core and an exhaust nozzle. The engine core may include a compressor configured to receive and compress an airflow, a combustor configured to receive a compressed airflow from the compressor and combust the compressed airflow to produce hot, high-pressure combustion products, and a turbine configured to interact with the high-pressure combustion products. The exhaust nozzle may be configured to receive the high-pressure combustion products from the engine core and discharge the high-pressure combustion products to the atmosphere.

In some embodiments, the exhaust nozzle may include an outer shroud arranged circumferentially about an axis to define an outer boundary surface of an exhaust nozzle flow path, an inner plug arranged circumferentially about the axis to define an inner boundary surface of the exhaust nozzle flow path, and at least one support vane that extends between the outer shroud and the inner plug through the exhaust nozzle flow path.

In some embodiments, the inner plug includes a plug-support frame coupled to the support vane to position the inner plug in the exhaust nozzle flow path and an outer plug shell coupled to the plug-support frame to provide an outer flow path boundary for the inner plug. The plug-support frame may be configured to block movement of the outer plug shell relative to the plug-support frame and allow thermal expansion and contraction of the outer plug shell as a temperature of the exhaust nozzle changes.

In some embodiments, the plug-support frame includes a main body that extends longitudinally along the central axis, a load-bearing disk coupled to the main body, and a plurality of load-bearing rods that interconnect the main body and the outer plug shell to transfer loads from the outer plug shell to the main body as the outer vane shell expands radially outward away from the central axis.

In some embodiments, each of the plurality of load-bearing rods includes a support shaft that is coupled to the main body for pivotable movement relative to the main body. Each of the support shafts is coupled to the outer plug shell for pivotable movement relative to the outer plug shell.

In some embodiments, the outer plug shell includes a centerbody section that has a cylindrical shape and a nozzle section that has a droplet shape and each of the plurality of load-bearing rods is coupled to the nozzle section. In some embodiments, each of the plurality of load-bearing rods is coupled to the nozzle section downstream of where the nozzle section has a greatest diameter.

In some embodiments, the outer plug shell includes load-transfer ring that is aligned with the load-bearing disk relative to the central axis. The load-bearing disk is formed to include a plurality of first axially-extending slots spaced circumferentially about the central axis to provide a plurality of first keys that engage the load-transfer ring to transfer loads from the outer plug shell to the main body. The load-transfer ring is formed to include a plurality of second axially-extending slots spaced circumferentially about the central axis to provide a plurality of second keys that interlock with the plurality of first keys of the load-bearing disk. The load-bearing ring and the load-transfer ring are configured to translate relative to one another as a temperature of the exhaust nozzle changes.

According to another aspect of the present disclosure, an exhaust nozzle for a gas turbine engine includes an outer shroud, an inner plug, and at least one support vane. The outer shroud may be arranged circumferentially about an axis to define an outer boundary surface of an exhaust nozzle flow path. The inner plug may be arranged circumferentially about the axis to define an inner boundary surface of the exhaust nozzle flow path. The at least one support vane may extend between the outer shroud and the inner plug through the exhaust nozzle flow path.

In some embodiments, the inner plug includes a plug-support frame coupled to the support vane to position the inner plug in the exhaust nozzle flow path and an outer plug shell coupled to the plug-support frame to provide an outer flow path boundary for the inner plug, the plug-support frame being configured to block movement of the outer plug shell relative to the plug-support frame and allow thermal expansion and contraction of the outer plug shell as a temperature of the exhaust nozzle changes.

In some embodiments, the plug-support frame includes a main body that extends longitudinally along the central axis, a load-bearing disk coupled to the main body, and a plurality of load-bearing rods that interconnect the main body and the outer plug shell to transfer loads from the outer plug shell to the main body as the outer vane shell expands radially outward away from the central axis.

In some embodiments, each of the plurality of load-bearing rods includes a support shaft that is mounted to the main body for pivotable movement relative to the main body. In some embodiments, each support shaft is mounted to the outer plug shell for pivotable movement relative to the outer plug shell.

In some embodiments, the outer plug shell includes a centerbody section that has a cylindrical shape and a nozzle section that has a droplet shape and each of the plurality of load-bearing rods is coupled to the nozzle section. In some embodiments, each of the plurality of load-bearing rods is coupled to the nozzle section downstream of where the nozzle section has a greatest diameter.

In some embodiments, the outer plug shell includes load-transfer ring that is aligned with the load-bearing disk relative to the central axis. In some embodiments, the load-bearing disk is formed to include a plurality of first axially-extending slots spaced circumferentially about the central axis to provide a plurality of first keys that engage the load-transfer ring to transfer loads from the outer plug shell to the main body. In some embodiments, the load-transfer ring is formed to include a plurality of second axially-extending slots spaced circumferentially about the central axis to provide a plurality of second keys that interlock with the plurality of first keys of the load-bearing disk. In some embodiments, the load-bearing ring and the load-transfer ring are configured to translate relative to one another as a temperature of the exhaust nozzle changes.

These and other features of the present disclosure will become more apparent from the following description of the illustrative embodiments.

BRIEF DESCRIPTION OF THE DRAWINGS

FIG. 3 is a cross sectional view of the inner plug and a portion of the support vanes taken along line 3-3 in FIG. 2 showing that the plug-support frame includes a main body arranged along the central axis, a load-bearing ring coupled to the main body, and a plurality of load-bearing rods that interconnect the main body and the outer plug shell;

FIG. 4 is a cross sectional view of the inner plug taken along line 4-4 in FIG. 2 showing the outer plug shell spaced apart from the main body and the plurality of load-bearing rods interconnecting the main body and the outer support vane;

DETAILED DESCRIPTION OF THE DRAWINGS

Figure 1:
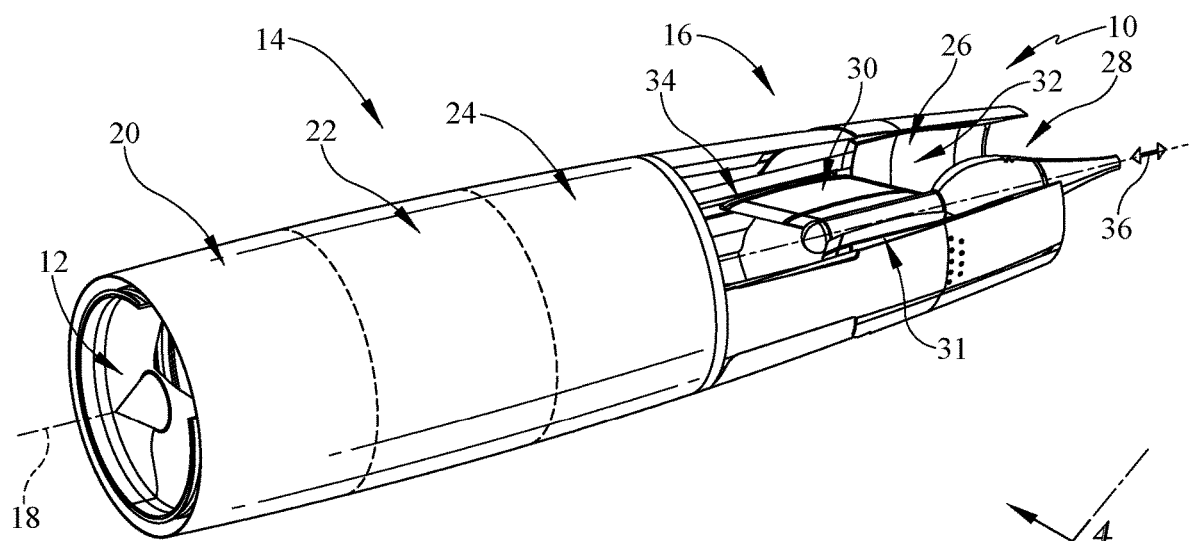
FIG. 1 is a perspective view of a gas turbine engine that includes a fan, an engine core, and an exhaust nozzle arranged downstream of the engine core with a section of the exhaust nozzle cut away to show that the exhaust nozzle includes an outer shroud, an inner plug spaced radially inward from the outer shroud, and a pair of support vanes that interconnect the outer shroud and the inner plug within an exhaust nozzle flow path of the exhaust nozzle.

For the purposes of promoting an understanding of the principles of the disclosure, reference will now be made to a number of illustrative embodiments illustrated in the drawings and specific language will be used to describe the same.

An aerospace gas turbine engine 10 is shown in FIG. 1 and includes a fan 12, an engine core 14, and exhaust nozzle 16. The fan 12 is coupled to the engine core 14 for rotation by the engine core 14 about an axis 18 during use. The engine core 14 receives and combusts fuel to drive rotation of one or more shafts (not shown). The exhaust nozzle 16 is located axially aft of the engine core 14 and is configured to expel exhaust products produced by the engine core 14 downstream into the atmosphere.

The engine core 14 includes a compressor section 20, a combustor section 22, and a turbine section 24 as shown in FIG. 1. The compressor section 20 compresses and delivers pressurized air to the combustor section 22. The combustor section 22 mixes fuel with the pressurized air received from the compressor section 20 and ignites the fuel. The hot, high-pressure products of the combustion reaction in the combustor section 22 are directed into the turbine section 24 to cause portions of the turbine section 24 to rotate about the axis 18 and drive portions of the compressor section 20. The fan 12 is also coupled to the turbine section 24 by at least one of the shafts driven in rotation by the engine core 14 and provides thrust for propelling an air vehicle when rotated by the turbine section 24. The exhaust products of the engine core 14 are directed into the exhaust nozzle 16 where a flow of the exhaust products are manipulated by the exhaust nozzle 16 prior to being released into the atmosphere.

Figure 2:
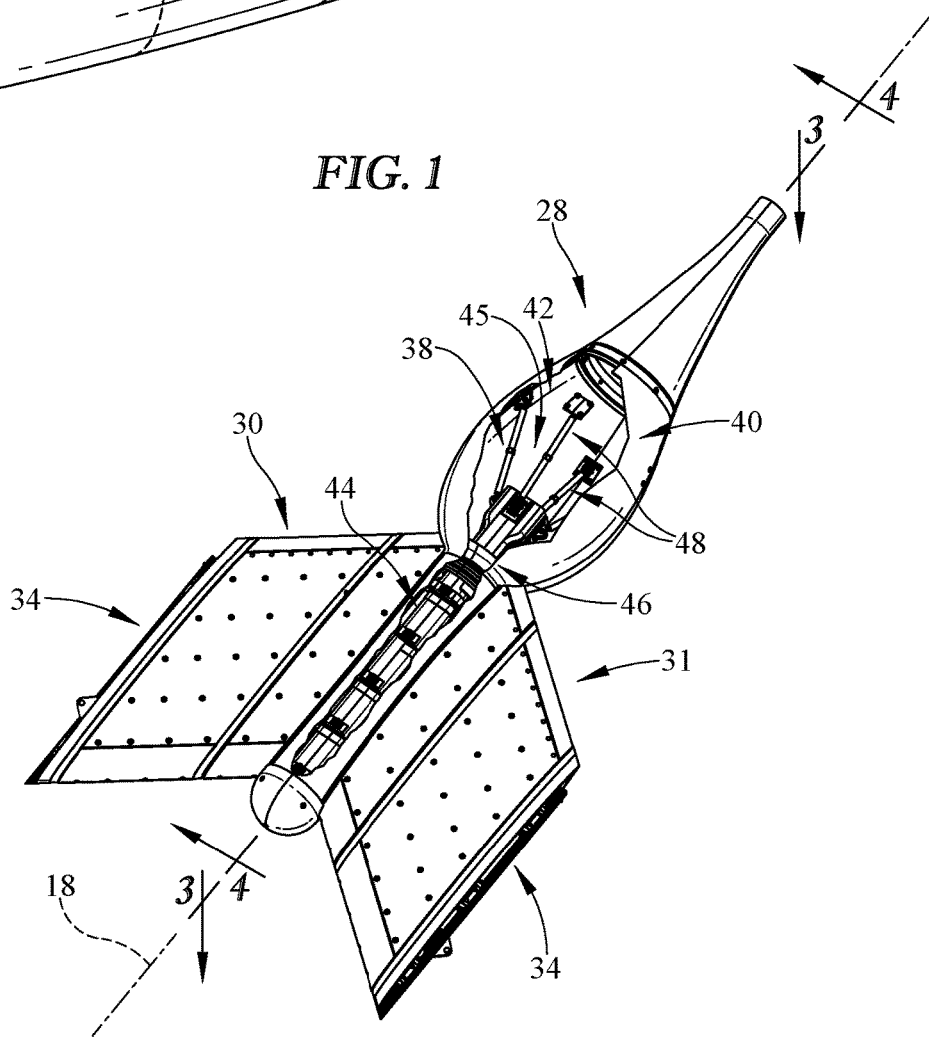
FIG. 2 is a perspective view of the inner plug and the support vanes of the exhaust nozzle shown in FIG. 1 with a portion of the inner plug cut away to show that the inner plug includes an outer plug shell and an internal plug-support frame to transfer loads acting on the outer plug shell to the support vanes and to the outer shroud while allowing for thermal expansion of the outer plug shell relative to the plug-support frame during use as suggested in FIG. 5.

The exhaust nozzle 16 includes an outer shroud 26, an inner plug 28, and at least one support vane 30 as shown in FIGS. 1 and 2. The outer shroud 26 extends circumferentially around the axis 18. The inner plug 28 cooperates with the outer shroud 26 to form an exhaust nozzle flow path 32 therebetween. The at least one support vane 30 interconnects the outer shroud 26 and the inner plug 28 to support the inner plug 28 in the exhaust nozzle flow path 32. The exhaust products from the engine core 14 flow downstream through the exhaust nozzle flow path 32 from the engine core 14 to the atmosphere.

The support vane 30 is mounted to a track 34 in the outer shroud 26 for movement forward and aft along the axis 18 as suggested by the arrows 36 in FIG. 1. The inner plug 28 and at least one support vane 30 may translate axially relative to the outer shroud 26 to change a flow path area of the exhaust nozzle flow path 32 to optimize the flow of exhaust products for low noise emissions during take-off or increased engine efficiency at cruise. The inner plug 28 is arranged on the axis 18 and is supported in the exhaust nozzle flow path 32 by first and second support vanes 30, 31 as shown in FIGS. 1 and 2. The support vanes 30, 31 are identical to one another except that they are swept forward away from the inner plug 28 in different directions. Only support vane 30 will be discussed below and the disclosure related to support vane 30 is hereby incorporated by reference for support vane 31.

Figure 5:
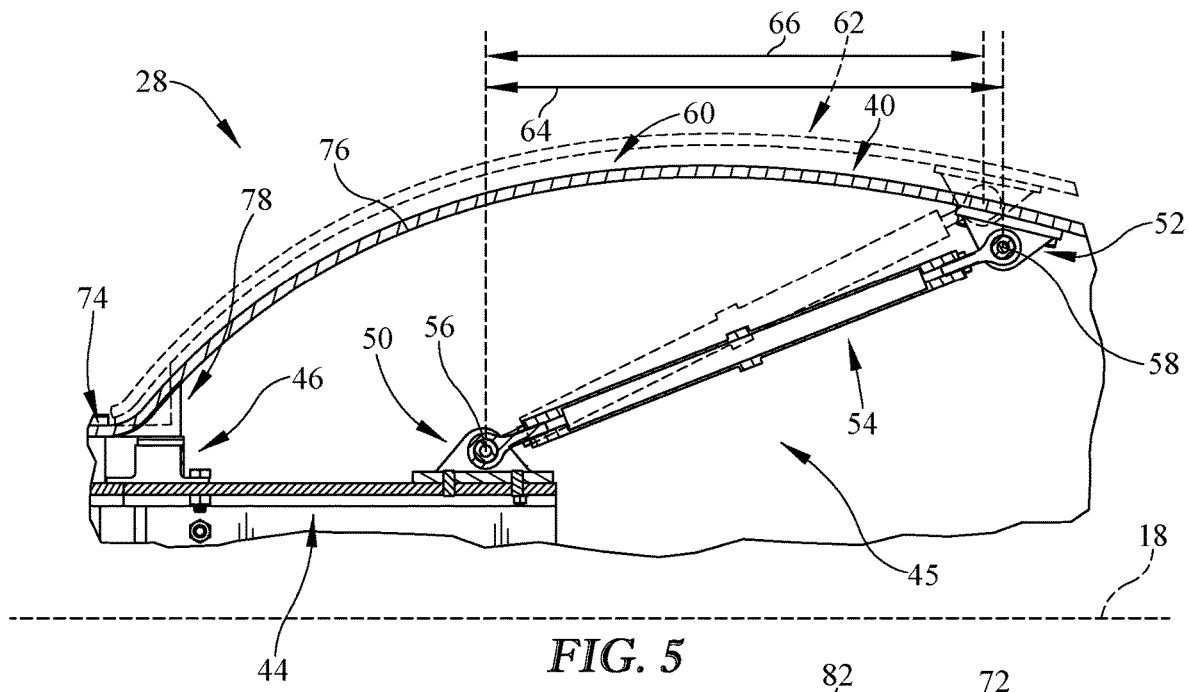
FIG. 5 is an enlarged view of a portion of FIG. 4 showing the inner plug in a cold-build state position and showing a dashed-line outline of the outer plug shell and the load-bearing rod in a hot-use state position to suggest relative movements of the outer plug shell and the plug-support frame as the exhaust nozzle is exposed to higher temperatures and expands thermally.

The inner plug 28 includes a plug-support frame 38 and an outer plug shell 40 as shown in FIGS. 2 and 3. The plug-support frame 38 is arranged within an internal space 45 defined by the outer plug shell 40. The outer plug shell 40 covers the plug-support frame 38 to provide an aerodynamic outer flow path boundary for the inner plug 28. The plug-support frame 38 is coupled to the outer plug shell 40 to support the outer plug shell 40 in the exhaust nozzle flow path 32. The plug-support frame 38 is configured to transfer loads acting on the outer plug shell 40 to the support vane 30 and into the outer shroud 26 while allowing the outer plug shell 40 to expand and contract due to exposure to the hot exhaust products from the engine core 14 as shown in FIG. 5.

The outer plug shell 40 is supported by the plug-support frame 38 but is free floating relative to the plug-support frame 38. The plug-support frame 38 is arranged within an internal space 42 defined by the outer plug shell 40 and includes a main body 44, a load-bearing disk 46, and a plurality of load-bearing rods 48 as shown in FIGS. 3 and 4. The main body 44 extends longitudinally through the internal space 42 along the central axis 18. The load-bearing disk 46 is coupled to the main body 44 and extends radially outward from the central axis 18. The plurality of load-bearing rods 48 interconnect the main body 44 and the outer plug shell 40 to transfer loads from the outer plug shell 40 to the main body 44.

The main body 44 is generally in the shape of a rectangular prism and extends through the internal space 42 only along a portion of a length of the inner plug 28 as shown in FIGS. 3 and 4. The main body 44 is sized to minimize a total weight of the inner plug 28 while still providing sufficient support for the outer plug shell 40 and reinforcement for the inner plug 28. The rectangular prism shape of the main body is defined by four side walls with a single load-bearing rod 48 mounted on a face of each side wall. In some embodiments, the shape of the main body 44 may be different, such as, for example a cylinder or any other polygonal prism shape. More or less load-bearing rods 48 may be used depending on the number of side walls included in the main body 44.

Each of the plurality of load-bearing rods 48 extend away from the main body 44 at an angle relative to the central axis 18 as shown in FIGS. 3 and 4. The plurality of load-bearing rods 48 diverge away from one another as they extend aft from the main body 44 to the outer plug shell 40. Each load-bearing rod 48 includes a first mount 50 coupled to the main body 44, a second mount 52 coupled to the outer plug shell 40, and a support shaft 54 that extends between the first mount 50 and the second mount 52. The support shaft 54 is mounted to the main body 44 for pivotable movement relative to the main body 44 about a first pivot axis 56 provided by the first mount 50. The support shaft 54 is also mounted to the outer plug shell 40 for pivotable movement relative to the outer plug shell 40 about a second pivot axis 58 provided by the second mount 52.

The exhaust nozzle 16 is positioned directly downstream of the engine core 14. The hot exhaust products from the engine core 14 may cause thermal expansion of some components in the exhaust nozzle 16 as the exhaust nozzle changes from a cold-build state to a hot-use state during use as suggested in FIG. 5. To comply with these thermal expansion effects, the support shaft 54 is configured to pivot about the first and second pivot axes 56, 58 as the outer plug shell 40 expands radially outward away from the central axis 18 as suggested in FIG. 5.

The outer plug shell 40 is configured to expand in response to exposure to the hot exhaust products that causes the outer plug shell 40 to change from a cold-build state position 60, in which the outer plug shell 40 has a first diameter, to a hot-use state position 62, in which the outer plug shell 40 has a second diameter larger than the first diameter as shown in FIG. 5. As the outer plug shell 40 grows relative to the plug-support frame 38, the plug-support frame 38 moves relative to the outer plug shell to accommodate the varying size of the outer plug shell 40 without forming adverse stresses between the plug-support frame 38 and the outer plug shell 40. At the same time, the plug-support frame 38 continues to support and transfer loads from the outer plug shell 40 to the support vanes 30 and to the outer shroud 26. The plug-support frame 38 may also grow thermally with the outer plug shell 40 in some embodiments.

The support shafts 54 diverge away from one another at a greater angle relative to the central axis 18 in the hot-use state compared to the cold-build state as shown in FIG. 5. As the support shaft 54 pivots about the first and second axes 56, 58, the outer plug shell 40 and/or the main body 44 translate axially along the axis 18 to accommodate the thermal growth in conjunction with the pivoting of the support shafts 54. The first and second axes 56, 58 are spaced axially from one another a first distance 64 in the cold-build state and a second distance 66, less than the first distance 64, in the hot-use state, due to the axial translation of the outer plug shell 40 and/or the main body 44.

The outer plug shell 40 may be divided into several different sections or panels to accommodate the thermal expansion of the outer plug shell 40 as shown in FIGS. 2-5. In the illustrative embodiment, the outer plug shell 40 includes a dome section 68, a centerbody section 70, and a nozzle section 72. The dome section 68 provides an axially forward end of the inner plug 28 and has a dome shape to increase aerodynamics of the outer plug shell 40. The centerbody section 70 has a cylindrical shape and extends aft from the dome section 68 to the nozzle section 72. The nozzle section 72 has a varying diameter as it extends axially to provide a droplet shape. The nozzle section 72 cooperates with the outer shroud 26 to provide a tailored throat area for the exhaust nozzle flow path 32 that changes depending on an axial location of the inner plug 28 relative to the outer shroud 26.

The nozzle section 72 includes a leading end portion 74, a body portion 76 and a load-transfer ring 78 coupled to at least one of the leading end portion 74 and the body portion 76 as shown in FIGS. 4 and 5. The leading end portion 74 has a constant diameter. The leading end portion 74 is sealed against the centerbody section 70 to discourage entrance of hot gases into the space 45. The body portion 76 has a varying diameter to define the droplet shape. Each of the plurality of load-bearing rods 48 is coupled to the body portion 76 of the nozzle section 72 as shown in FIGS. 3-5. In the illustrative embodiment, each of the plurality of load-bearing rods 48 is coupled to the nozzle section 72 downstream of where the body portion 76 has a greatest diameter. The load-transfer ring 78 is aligned with the load-bearing disk 46 relative to the central axis 18 and cooperates with the load-bearing disk 46 to block radial and circumferential movement of the outer plug shell 40 relative to the plug-support frame 38.

The centerbody section 70 has a diameter that is slightly greater than a diameter of a leading edge of the nozzle section 72. The centerbody section 70 and the nozzle section 72 partially overlap with a portion of the nozzle section 72 being received in the centerbody section 70 as shown in FIG. 4. As the nozzle section 72 grows radially, the support shafts 58 rotate in response to the radial growth of the nozzle section 72. The support shafts 54 cause the nozzle section 72 to translate axially forward relative to the central axis 18 as the support shafts 58 rotate. As the nozzle section 72 grows radially and is translated axially forward by the support shafts 58, the nozzle section 72 extends further into the centerbody section 70. The load-transfer ring 78 translates axially forward with the nozzle section 72 and relative to the load-bearing disk 46 as suggested in FIG. 5.

Figure 6:
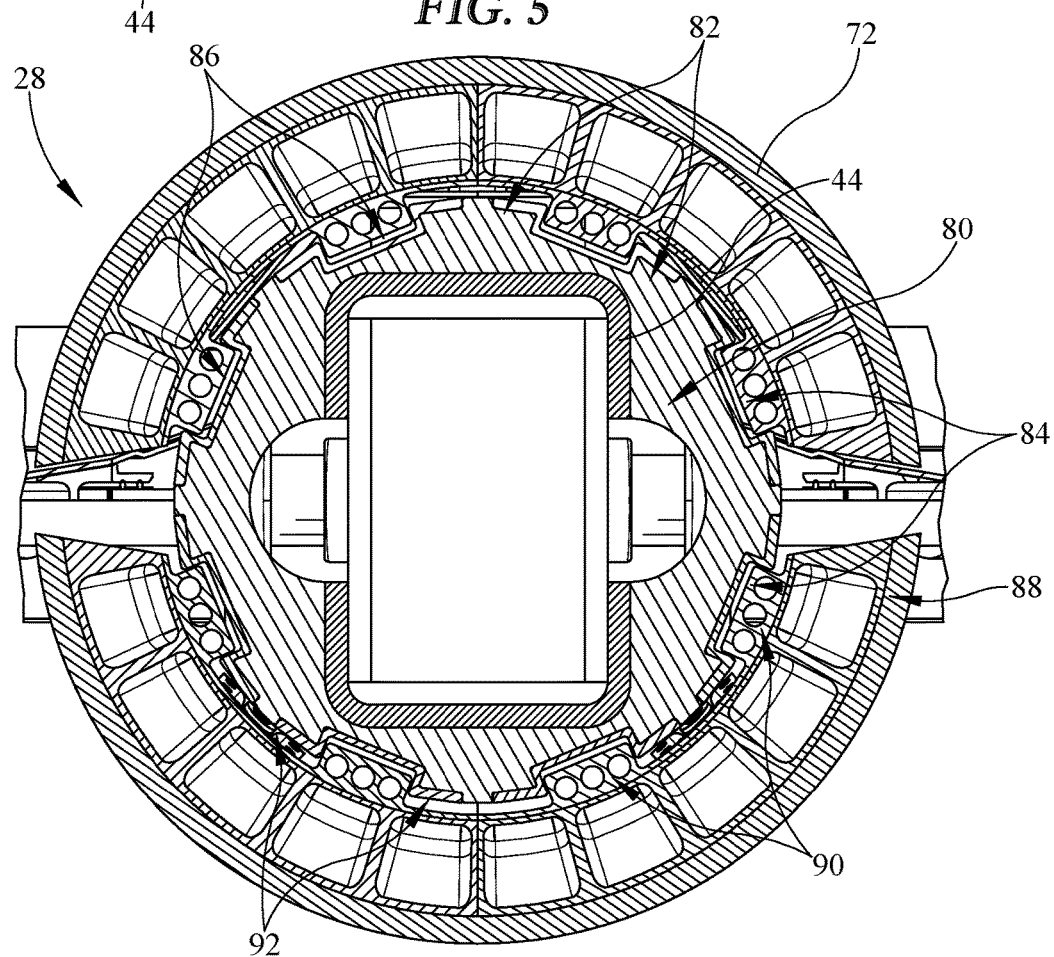
FIG. 6 is a cross sectional view of the inner plug taken along line 6-6 in FIG. 4 showing the load-bearing disk engaged with a load-transfer ring coupled to the outer plug shell to block radial and circumferential movement of the outer vane shell relative to the plug-support frame.

The load-bearing disk 46 is mounted to the main body 44 in a fixed position as shown in FIGS. 3-6. The load-bearing disk 46 includes a core 80, a plurality of first keys 82, and a plurality of wear strips 84 as shown in FIG. 6. The core 80 is mounted on the main body 44 and extends radially outward from the main body 44. The plurality of first keys 82 are spaced apart circumferentially from one another around the axis 18 to define a plurality of first axially-extending slots 86 therebetween. Each slot 86 is lined with one of the plurality of wear strips 84.

The load-transfer ring 78 is mounted to the nozzle section 72 of the outer plug shell 40 and is configured to engage the load-bearing disk 46 to transfer loads from the outer plug shell 40 to the main body 44. The load-transfer ring 78 includes an outer band 88 and a plurality of second keys 90 as shown in FIG. 6. The outer band 88 extends radially inward from the outer plug shell 40 toward the load-bearing disk 46. The plurality of second keys 90 are spaced apart circumferentially from one another to define a plurality of second axially-extending slots 92 therebetween. The plurality of first keys 82 extend into the plurality of second axially-extending slots 92 and the plurality of second keys 90 extend into the plurality of first axially-extending slots 86 when assembled. The plurality of keys 82, 90 are interlocked with corresponding slots 86, 92 to block radial and circumferential movement of the outer plug shell 40 relative to the plug-support frame 38.

The load-bearing disk 46 and the load-transfer ring 78 are configured to translate relative to one another as a temperature of the exhaust nozzle 16 changes. The load-bearing disk 46 and the load-transfer ring 78 are sized with an axial thickness that corresponds with a calculated amount of translation so that the load-bearing disk 46 and the load-transfer ring 78 do not become disengaged due to thermal expansion. The wear strips 84 may be an anti-friction/anti-wear coating or a sacrificial plate that can be replaced at the end of the strips useful life.

In some embodiments, the gas turbine engine 10 may be used on an aircraft that supports supersonic flight. The engine 10 include an exhaust nozzle 16 that may have an integral thrust reverser and the ability to vary the nozzle throat area. The exhaust nozzle 16 (a nozzle that incorporates an aft centerbody) may provide a broad efficiency peak across operating ranges of the gas turbine engine 10. The shaping of the inner and outer flow path lines may provide efficient operation at the cruise point and quiet operation during takeoff.

In some embodiments, the plug is supported by vanes that are attached to the Exhaust Nozzle case and transfer load to through the case to the nozzle support system. The plug may be supported by 2, 3, 4 or any suitable number of vanes. These configurations may share a common design feature in that the plug is allowed to grow thermally without adversely affecting the operation of the system, while at the same time passing aerodynamic loads to the vanes and to the outer shroud.

In some embodiments, the plug is thermally compliant (it allows thermal growth without thermally induced loads). This is accomplished by providing a forward structure (main body 44), connecting links, i.e. turnbuckles, (load-bearing rods 48) and a cross-key support (load-bearing disk 46). The forward support is structurally tied to the vane structure using a load shaft at the front and aft of the vane. The forward support is coupled with the plug by four turnbuckles mounted close to the largest diameter of the plug and cross-keys at the front of the plug. As the plug grows radially from the thermals, the aft turnbuckles rotate to follow this movement and move the plug forward or aft at the cross-key. This arrangement allows each component to grow thermally without inducing thermal loads into the structure while at the same time providing load paths from the plug to the outer support case for the blow-off and maneuver loads for each component.

In some embodiments, the loads developed are passed from the plug shell through the turnbuckles and cross-keys to the forward support. From there they are passed through the vane structure to the guide track and actuator to the aircraft structure. The internal arrangement of the forward support for a three and four vane configuration would have some minor variations, but the concept would remain the same.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
an engine core including a compressor configured to receive and compress an airflow, a combustor configured to receive a compressed airflow from the compressor and combust the compressed airflow to produce hot, high-pressure combustion products, and a turbine configured to interact with the high-pressure combustion products, and
an exhaust nozzle configured to receive the high-pressure combustion products from the engine core and discharge the high-pressure combustion products to the atmosphere, the exhaust nozzle including an outer shroud arranged circumferentially about a central axis to define an outer boundary surface of an exhaust nozzle flow path, an inner plug arranged circumferentially about the axis to define an inner boundary surface of the exhaust nozzle flow path, and at least one support vane that extends between the outer shroud and the inner plug through the exhaust nozzle flow path,
wherein the inner plug includes a plug-support frame coupled to the support vane to position the inner plug in the exhaust nozzle flow path and an outer plug shell coupled to the plug-support frame to provide an outer flow path boundary for the inner plug, the plug-support frame being configured to support the outer plug shell relative to the plug-support frame and allow thermal expansion and contraction of the outer plug shell from a cold-build state to a hot-use state as a temperature of the exhaust nozzle changes,
wherein the plug-support frame includes a main body that extends longitudinally along the central axis, a load-bearing disk coupled to the main body, and a plurality of load-bearing rods that interconnect the main body and the outer plug shell,
wherein the outer plug shell includes a load-transfer ring at least partially aligned with the load-bearing disk,
wherein the load-bearing disk is formed to include a plurality of first axially-extending slots spaced circumferentially about the central axis to provide a plurality of first keys that engage the load-transfer ring to transfer loads from the outer plug shell to the main body, and
wherein the load-transfer ring is configured to translate axially along the central axis and relative to the load-bearing disk as the exhaust nozzle changes from the cold-build state to the hot-use state.

2. The gas turbine engine of claim 1, wherein each of the plurality of load-bearing rods includes a support shaft that is coupled to the main body for pivotable movement relative to the main body.

3. The gas turbine engine of claim 2, wherein each support shaft is coupled to the outer plug shell for pivotable movement relative to the outer plug shell.

4. The gas turbine engine of claim 1, wherein the outer plug shell includes a centerbody section that has a cylindrical shape and a nozzle section that has a droplet shape and each of the plurality of load-bearing rods is coupled to the nozzle section.

5. The gas turbine engine of claim 4, wherein each of the plurality of load-bearing rods is coupled to the nozzle section downstream of where the nozzle section has a greatest diameter.

6. The gas turbine engine of claim 1, wherein the load-transfer ring is aligned with the load-bearing disk relative to the central axis in the cold-build state.

7. The gas turbine engine of claim 1, wherein each of the plurality of load-bearing rods is arranged symmetrically about the central axis in the cold-build state and the hot-use state.

8. The gas turbine engine of claim 1, wherein each of the plurality of load-bearing rods includes a support shaft that is mounted to the main body for pivotable movement relative to the main body and the outer plug shell, a first mount coupled to the main body, and a second mount coupled to the outer plug shell, and wherein the first mount and the second mount are spaced axially from one another a first distance in the cold-build state and a second distance, less than the first distance, in the hot-use state.

9. A gas turbine engine comprising
an engine core including a compressor configured to receive and compress an airflow, a combustor configured to receive a compressed airflow from the compressor and combust the compressed airflow to produce hot, high-pressure combustion products, and a turbine configured to interact with the high-pressure combustion products, and
an exhaust nozzle configured to receive the high-pressure combustion products from the engine core and discharge the high-pressure combustion products to the atmosphere, the exhaust nozzle including an outer shroud arranged circumferentially about a central axis to define an outer boundary surface of an exhaust nozzle flow path, an inner plug arranged circumferentially about the axis to define an inner boundary surface of the exhaust nozzle flow path, and at least one support vane that extends between the outer shroud and the inner plug through the exhaust nozzle flow path,
wherein the inner plug includes a plug-support frame coupled to the support vane to position the inner plug in the exhaust nozzle flow path and an outer plug shell coupled to the plug-support frame to provide an outer flow path boundary for the inner plug, the plug-support frame being configured to support the outer plug shell relative to the plug-support frame and allow thermal expansion and contraction of the outer plug shell from a cold-build state to a hot-use state as a temperature of the exhaust nozzle changes,
wherein the plug-support frame includes a main body that extends longitudinally along the central axis, a load-bearing disk coupled to the main body, and a plurality of load-bearing rods that interconnect the main body and the outer plug shell,
wherein the outer plug shell includes a load-transfer ring that is aligned with the load-bearing disk relative to the central axis in the cold build state, and
wherein the load-bearing disk is formed to include a plurality of first axially-extending slots spaced circumferentially about the central axis to provide a plurality of first keys that engage the load-transfer ring to transfer loads from the outer plug shell to the main body.

10. The gas turbine engine of claim 9, wherein the load-transfer ring is formed to include a plurality of second axially-extending slots spaced circumferentially about the central axis to provide a plurality of second keys that interlock with the plurality of first keys of the load-bearing disk.

11. The gas turbine engine of claim 10, wherein the load-transfer ring translates axially forward relative to the load-bearing disk in the hot-use state.

12. The gas turbine engine of claim 9, wherein each of the plurality of load-bearing rods includes a support shaft that is coupled to the main body for pivotable movement relative to the main body.

13. The gas turbine engine of claim 12, wherein each support shaft is coupled to the outer plug shell for pivotable movement relative to the outer plug shell.

14. The gas turbine engine of claim 9, wherein the outer plug shell includes a centerbody section that has a cylindrical shape and a nozzle section that has a droplet shape and each of the plurality of load-bearing rods is coupled to the nozzle section.

15. An exhaust nozzle for a gas turbine engine, the exhaust nozzle comprising
an outer shroud arranged circumferentially about a central axis to define an outer boundary surface of an exhaust nozzle flow path,
an inner plug arranged circumferentially about the axis to define an inner boundary surface of the exhaust nozzle flow path, and
at least one support vane that extends between the outer shroud and the inner plug through the exhaust nozzle flow path,
wherein the inner plug includes a plug-support frame coupled to the support vane to position the inner plug in the exhaust nozzle flow path and an outer plug shell coupled to the plug-support frame to provide an outer flow path boundary for the inner plug, the plug-support frame being configured to allow thermal expansion and contraction of the outer plug shell from a cold-build state to a hot-use state as a temperature of the exhaust nozzle changes,
wherein the outer plug shell is configured to translate axially forward relative to the support vane and the plug-support frame as the exhaust nozzle changes from the cold-build state to the hot-use state,
wherein the plug-support frame includes a main body that extends longitudinally along the central axis, a load-bearing disk coupled to the main body, and a plurality of load-bearing rods that interconnect the main body and the outer plug shell to transfer loads from the outer plug shell to the main body as the outer vane shell expands radially outward away from the central axis,
wherein the outer plug shell includes a load-transfer ring that is aligned with the load-bearing disk relative to the central axis, and wherein the load-bearing disk is formed to include a plurality of first axially-extending slots spaced circumferentially about the central axis to provide a plurality of first keys that engage the load-transfer ring to transfer loads from the outer plug shell to the main body.

16. The gas turbine engine of claim 15, wherein each of the plurality of load-bearing rods includes a support shaft that is mounted to the main body for pivotable movement relative to the main body.

17. The gas turbine engine of claim 16, wherein each support shaft is mounted to the outer plug shell for pivotable movement relative to the outer plug shell.

18. The gas turbine engine of claim 15, wherein the outer plug shell includes a centerbody section that has a cylindrical shape and a nozzle section that has a droplet shape and each of the plurality of load-bearing rods is coupled to the nozzle section.

19. The gas turbine engine of claim 18, wherein each of the plurality of load-bearing rods is coupled to the nozzle section downstream of where the nozzle section has a greatest diameter.

20. The gas turbine engine of claim 15, the load-transfer ring is formed to include a plurality of second axially-extending slots spaced circumferentially about the central axis to provide a plurality of second keys that interlock with the plurality of first keys of the load-bearing disk.

* * * * *